E. H. DEWSON.
ELECTRICALLY CONTROLLED PNEUMATIC BRAKE.
APPLICATION FILED JUNE 1, 1916.
1,299,144.
Patented Apr. 1, 1919.
2 SHEETS—SHEET 2.
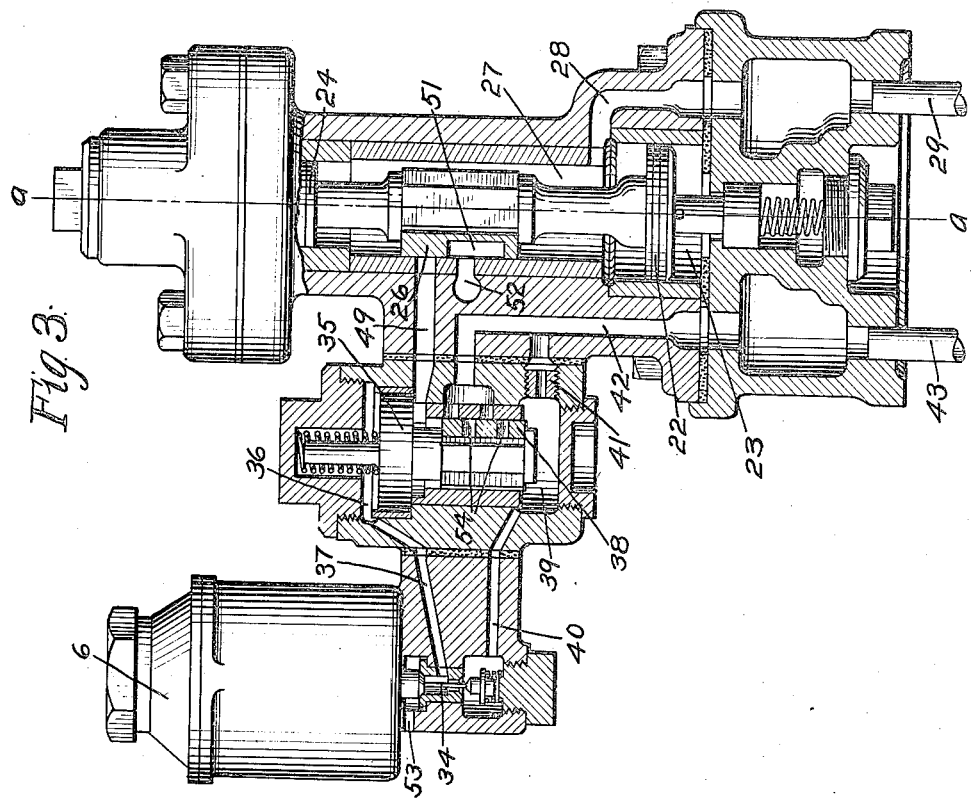
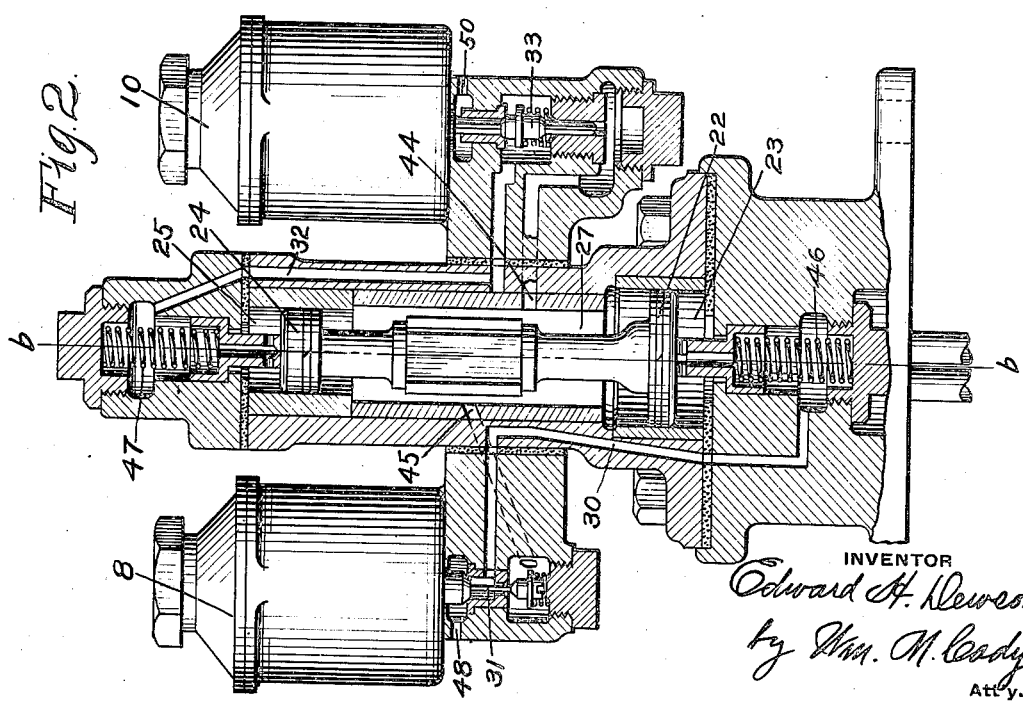
INVENTOR
Edward H. Dewson
by Wm. M. Cady
Att'y.

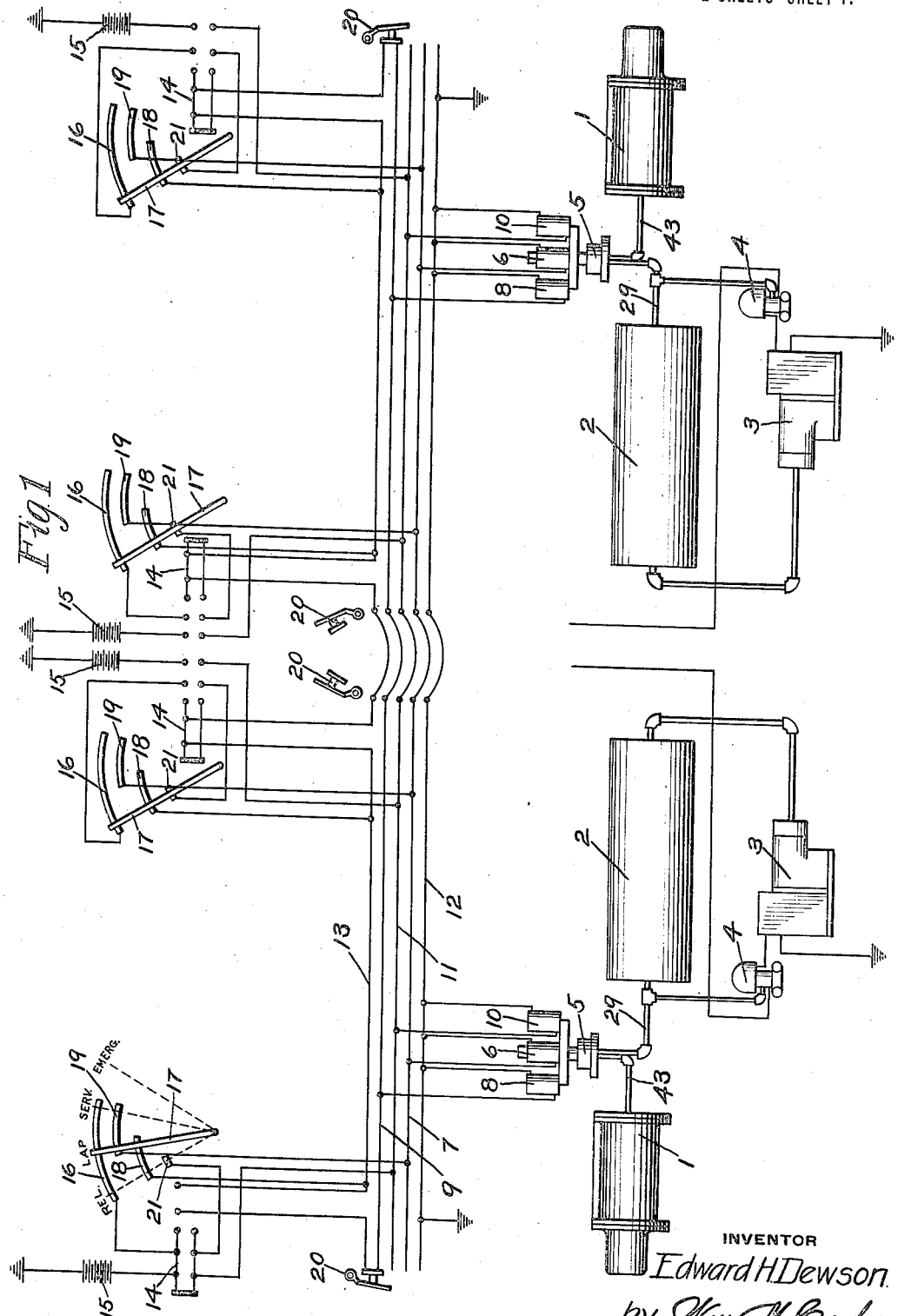

UNITED STATES PATENT OFFICE.

EDWARD H. DEWSON, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA.

ELECTRICALLY-CONTROLLED PNEUMATIC BRAKE.

1,299,144. Specification of Letters Patent. Patented Apr. 1, 1919.

Application filed June 1, 1916. Serial No. 101,043.

*To all whom it may concern:*

Be it known that I, EDWARD H. DEWSON, a citizen of the United States, residing at New York, in the county of New York and State of New York, have invented new and useful Improvements in Electrically-Controlled Pneumatic Brakes, of which the following is a specification.

This invention relates to electro-pneumatic brakes for railway vehicles, and more particularly to a system employing an electrically controlled pneumatically independent unit on each vehicle.

The principal object of my invention is to provide an improved electro-pneumatic brake of the above character.

Other objects and advantages will appear in the following more detailed description of the invention.

In the accompanying drawings; Figure 1 is a diagrammatic view of an electro-pneumatic brake equipment for two vehicles and embodying my invention; Fig. 2 a section of the electro-pneumatic brake controlling valve mechanism on the line $a$—$a$ of Fig. 3; and Fig. 3 a section thereof on the line $b$—$b$ of Fig. 2.

As shown in Fig. 1 of the drawings, the electro-pneumatic brake equipment may comprise on each vehicle a brake cylinder 1, a main reservoir 2, a compressor 3, a compressor governor 4, and an electro-pneumatic valve mechanism 5 having a service magnet 6 connected to train wire 7, an application magnet 8 connected to train wire 9, and a release magnet 10, connected to train wire 11, the other terminals of the magnets being connected to a common train wire 12.

An emergency train wire 13 is also provided which is connected at the end of the train by a contact device 20 with the application train wire 9 and leads extend from the emergency train wire at each end of the car to a double pole double throw switch 14 adapted in one position to close the circuit through the emergency wire and in another position to connect a grounded source of current 15 with a contact 16 of the controller. As shown diagrammatically, the braking controller may comprise a contact arm 17 adapted to engage in its different positions, the power contact 16, a contact 18 connected to emergency train wire 13, contact 19 connected to service train wire 7, and contact 21, connected to release train wire 11.

The brake controlling valve mechanism may comprise a differential piston device having a large piston head 22 contained in piston chamber 23, a small piston head 24 contained in piston chamber 25, and a slide valve 26 contained in valve chamber 27 connected by passage 28 and pipe 29 to main reservoir 2.

Piston chamber 23 is connected to a passage 30 controlled by a double beat valve 31 operated by application magnet 8 and piston chamber 25 is connected to a passage 32 controlled by a double beat valve 33 adapted to be operated by release magnet 10.

The service magnet 6 controls a double beat valve 34 adapted to effect the operation of a valve device for controlling the rate of flow to the brake cylinder. Said valve device may comprise a piston 35 contained in piston chamber 36 connected by passage 37 to the double beat valve 34 and a valve 38 contained in valve chamber 39 connected by passage 40 to said double beat valve and having a choke plug 41 with a restricted passage leading to passage 42 and pipe 43 which connects with the brake cylinder 1.

In operation, all of the switches 14 except the switch at the operating end of the car are thrown to the position for closing the emergency train wire circuit while the switch 14 at the operating end is thrown so as to connect the source of current 15 with controller contact 16.

The controller arm 17 is left in release position at all the brake controlling switches not actually in use and in order to prevent the energization of the release circuit when the controller arm 17 is in lap position at the operating end of the car, the switch 14 is arranged to control the release circuit, in such manner that this circuit is closed only where the switch is thrown to the position for connecting the source of current 15 to the contact 16 at the operating end of the car.

With the controller arm 17 in lap position, it will be seen that the release magnet 10 is deënergized, and the magnets 6 and 8 are energized. Fluid from the main reservoir 2 on each vehicle flows through pipe 29 and passage 28 to valve chamber 27 and with the release magnet deënergized, the double beat valve 33 opens communication from valve chamber 27 through passage 44 to passage 32, so that piston chamber 25 is charged with fluid under pressure.

Magnet 8 when energized, causes double beat valve 31 to open communication from valve chamber 27 through passage 45 to passage 30, so that piston chamber 23 is charged, and since the fluid pressures are thus equalized on opposite sides of both piston heads 22 and 24, the springs 46 and 47 maintain the differential piston device in the lap position as shown in Fig. 3 of the drawings.

If it is desired to effect a service application of the brakes, the controller arm 17 is turned to service position in which the service magnet 6 is energized and the magnets 8 and 10 deënergized.

The deënergization of magnet 8 causes the movement of double beat magnet 31 to cut off communication from valve chamber 27 to piston chamber 23 and to open communication from said piston chamber to exhaust port 48. Fluid is thereupon vented from piston chamber 23 and the differential piston device is moved so that valve 26 uncovers a passage 49, thus permitting fluid from the main reservoir 2 to flow to valve chamber 39 and thence through the choke plug 41 to the passage 42 and brake cylinder 1.

The brakes are thus applied at a service rate and when the desired brake cylinder pressure has been obtained, the controller arm 17 is moved to lap position, in which the magnet 8 is energized, so as to open communication from valve chamber 27 to piston chamber 23 and permit equalization of fluid pressure on the piston head 22. The differential piston device then moves to lap position and prevents further flow of fluid to the brake cylinder.

The brake cylinder pressure may be increased by again turning the controller arm to service position, or the brakes may be released by moving the arm 17 to release position, in which release magnet 10 is energized so as to operate the double beat valve 33 for closing communication from valve chamber 27 to piston chamber 25 and for opening said piston chamber to exhaust port 50.

Venting fluid from piston chamber 25 causes movement of the differential piston device, so as to connect passage 49 through a cavity 51 with exhaust port 52. In release position, it will be noted that service magnet 6 is deënergized and therefore the double beat valve 34 is operated to close communication from valve chamber 39 to piston chamber 36 and to open piston chamber 36 to exhaust port 53.

Brake cylinder pressure in valve chamber 39 then acts on piston 35 so as to shift valve 38 and cause ports 54 to register with passage 42. The prompt release of the brakes is thus assured since fluid from the brake cylinder can exhaust through the ports 54 as well as through the choke plug 41.

An automatic emergency application of the brakes can be effected by turning the controller arm 17 to emergency position, in which all of the magnets are deënergized.

The deënergization of magnet 8 causes the movement of the differential piston device to application position, as in service, and the deënergization of magnet 6 causes the movement of piston 35 to open the large brake cylinder supply ports 54, so that fluid from the main reservoir will be supplied to the brake cylinder at a rapid rate to effect an emergency application of the brakes.

If the train breaks in two or current fails, all the magnets will be deënergized except the service magnet on the head car and evidently an emergency application of the brakes will be effected the same as when the controller arm is thrown to emergency position, except that a service application of the brakes will be effected on the head car, it being noted that since current is supplied to the application magnets through the emergency train line to the application train wire, any break in the emergency train line will cause the deënergization of all the application magnets throughout the train except the service magnet on the head car.

An emergency application of the brakes will also be effected except on the head car, if one of the switches 14 is opened by the conductor or other person on any car of the train, since this effects the opening of the emergency circuit.

Having now described my invention, what I claim as new and desire to secure by Letters Patent, is:

1. In an electro-pneumatic brake, the combination with an electrically controlled valve device for effecting an application of the brakes, of electrically controlled means for varying the area of the passageway through which said valve device supplies fluid to apply the brakes.

2. In an electro-pneumatic brake, the combination with a brake cylinder and an electrically controlled valve device for controlling the admission of fluid to the brake cylinder, of electrically controlled means for varying the effective area of the passageway through which fluid is supplied by said valve device to the brake cylinder.

3. In an electro-pneumatic brake, the combination with a brake cylinder and an electrically controlled valve device for controlling the admission of fluid to the brake cylinder, of electrically controlled means for restricting the effective area of the passageway through which said valve device supplies fluid to the brake cylinder in a service application of the brakes.

4. In an electro-pneumatic brake, the combination with a brake cylinder and an electrically controlled valve device for controlling the admission of fluid to the brake cylinder, of electrically controlled means for closing a by-pass in the passageway through which said valve device supplies fluid to the brake cylinder in a service application of the brakes and for opening said by-pass in an emergency application of the brakes.

5. In an electro-pneumatic brake, the combination with a brake cylinder, of a valve device for controlling the admission of fluid to the brake cylinder, a magnet valve adapted upon deënergization to operate said valve device and supply fluid to the brake cylinder, a valve device for controlling the rate of flow to the brake cylinder, and a magnet valve adapted upon deënergization to operate said valve device and permit flow to the brake cylinder at a rapid rate.

6. In an electro-pneumatic brake, the combination with a brake cylinder, of a valve device for controlling the admission of fluid to the brake cylinder, a magnet valve adapted upon deënergization to operate said valve device and supply fluid to the brake cylinder through a restricted port, a valve device for controlling an additional brake cylinder supply port, and a magnet valve adapted upon deënergization for effecting the operation of said valve device to open said additional port.

7. In an electro-pneumatic brake, the combination with a brake cylinder, of a valve device having differential piston heads and adapted to control the admission and release of fluid to and from the brake cylinder, a magnet controlled valve for varying the pressure on one piston head to effect the release of fluid from the brake cylinder, and a magnet controlled valve for varying the pressure on the other piston head for effecting the admission of fluid to the brake cylinder.

8. In an electro-pneumatic brake, the combination with a brake cylinder, of a magnet and valve means operated upon deënergization of the magnet for supplying fluid through a restricted port to the brake cylinder to effect a service application of the brakes, and a magnet and valve means operated upon deënergization of said magnet for opening a large port through which fluid is supplied to the brake cylinder to effect an emergency application of the brakes.

9. In an electro-pneumatic brake, the combination with a brake cylinder, of a valve device having a position in which communication for supplying fluid to the brake cylinder is restricted and another position in which a large communication is opened and a magnet controlled relay valve for effecting the operation of said valve device.

10. In an electro-pneumatic brake, the combination with a brake cylinder, of a valve device having one position for supplying fluid to the brake cylinder and another position for releasing fluid from the brake cylinder, magnet controlled relay valves for varying the pressure on said valve device to effect the movement of the valve device to said positions respectively, a valve device for varying the opening through which fluid is supplied to the brake cylinder, and a magnet controlled relay valve for effecting the operation of the last mentioned valve device.

In testimony whereof I have hereunto set my hand.

EDWARD H. DEWSON.